United States Patent
Han et al.

(10) Patent No.: US 10,594,369 B2
(45) Date of Patent: Mar. 17, 2020

(54) CHANNEL INFORMATION FEEDBACK METHOD, CHANNEL INFORMATION DETERMINING METHOD, RECEIVE END DEVICE, AND TRANSMIT END DEVICE

(71) Applicant: HUAWEI TECHNOLOGIES CO., LTD., Shenzhen (CN)

(72) Inventors: Wei Han, Shanghai (CN); Huangping Jin, Shanghai (CN); Xiaoyan Bi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/504,354

(22) Filed: Jul. 8, 2019

(65) Prior Publication Data
US 2019/0334588 A1  Oct. 31, 2019

Related U.S. Application Data

(63) Continuation of application No. PCT/CN2018/071283, filed on Jan. 4, 2018.

(30) Foreign Application Priority Data

Jan. 7, 2017  (CN) .......................... 2017 1 0011654

(51) Int. Cl.
*H04B 7/0417* (2017.01)
*H04B 7/06* (2006.01)

(52) U.S. Cl.
CPC ......... *H04B 7/0417* (2013.01); *H04B 7/0626* (2013.01); *H04B 7/0634* (2013.01)

(58) Field of Classification Search
CPC .. H04B 7/0417; H04B 7/0626; H04B 7/0634; H04B 7/0669; H04L 1/0618; H04L 1/06; H04L 25/0204
See application file for complete search history.

(56) References Cited

U.S. PATENT DOCUMENTS

| 2014/0177745 A1* | 6/2014 | Krishnamurthy | .... H04B 7/0413 375/267 |
| 2014/0254508 A1* | 9/2014 | Krishnamurthy | .... H04B 7/0417 370/329 |

(Continued)

FOREIGN PATENT DOCUMENTS

| CN | 101771442 A | 7/2010 |
| CN | 102545979 A | 7/2012 |
| WO | 2016068628 A1 | 5/2016 |

OTHER PUBLICATIONS

R1-162693 Samsung: "Linear combination codebook and CSI reporting", 3GPP DRAFT; vol. RAN WG1, No. Busan, Korea; Apr. 11, 2016-Apr. 15, 2016, Apr. 1, 2016, XP051079834, 6 pages.

(Continued)

*Primary Examiner* — Ted M Wang
(74) *Attorney, Agent, or Firm* — Kilpatrick Townsend & Stockton LLP

(57) ABSTRACT

Embodiments of the present invention provide a channel information feedback method, a channel information determining method, a receive end device, and a transmit end device. The channel information feedback method includes: generating at least one piece of description information for each of a plurality of subbands included in a wideband, where each piece of description information is used to describe a description vector of a channel matrix corresponding to the subband, the description information includes at least one of a vector parameter and a weighting parameter; and sending the at least one piece of description information. The embodiments of the present invention further provide a channel information determining method, a receive end device, and a transmit end device. A precoding effect can be improved when precoding is performed based on the description vector fed back in the technical solutions provided in the embodiments of the present invention.

20 Claims, 7 Drawing Sheets

(56) References Cited

U.S. PATENT DOCUMENTS

2016/0142117 A1 5/2016 Rahman et al.
2017/0302353 A1* 10/2017 Rahman ............... H04B 7/0478

OTHER PUBLICATIONS

3GPP TS 36.213 V14.1.0, "3 Generation Partnership Project; Technical Specification Group Radio Access Network, Evolved Universal Terrestrial Radio Access (E-UTRA); Physical layer procedures (Release 14)", 3GPP Standard; vol. RAN WG1, No. , Jan. 2, 2017, p. 49-270.
Hooman Shirani-Mehr et al., "Channel State Feedback Schemes for Multiuser MIMO-OFDM Downlink", IEEE Transactions on Communications, dated Apr. 3, 2008, total 28 pages.

* cited by examiner

CHANNEL INFORMATION FEEDBACK METHOD, CHANNEL INFORMATION DETERMINING METHOD, RECEIVE END DEVICE, AND TRANSMIT END DEVICE

CROSS-REFERENCE TO RELATED APPLICATIONS

This application is a continuation of International Application No. PCT/CN2018/071283, filed on Jan. 4, 2018, which claims priority to Chinese Patent Application No. 201710011654.8, filed on Jan. 7, 2017. The disclosures of the aforementioned applications are hereby incorporated by reference in their entireties.

TECHNICAL FIELD

The present invention relates to the field of communications technologies, and in particular, to a channel information feedback method, a channel information determining method, a receive end device, and a transmit end device.

BACKGROUND

Emergence of a multiple-input multiple-output (Multiple-Input Multiple-Output, MIMO) technology has brought dramatically changes to wireless communications. A plurality of antennas are deployed on a transmit end device and a receive end device, so that the MIMO technology can significantly improve performance of a wireless communications system. For example, in a diversity scenario, the MIMO technology can effectively improve transmission reliability, and in a multiplexing scenario, the MIMO technology can greatly improve a transmission throughput.

In a MIMO system, a precoding technology is usually used to improve a channel, to enhance a spatial multiplexing (Spatial Multiplexing) effect. Specifically, the precoding technology uses a precoding matrix matching the channel to process a data stream of spatial multiplexing (briefly referred to as a spatial stream below), so as to precode the channel and improve receiving quality of the spatial stream.

The precoding matrix usually includes a plurality of column vectors. Each column vector may also be referred to as a precoding vector, and each precoding vector is used to precode a spatial stream. An ideal precoding vector used for describing a channel matrix may be obtained by performing singular value decomposition (Singular Value Decomposition, SVD) on the channel matrix. If the ideal precoding vector is directly fed back, feedback overheads are very high. In the prior art, a precoding vector is determined based on a codebook, a column vector is selected from the codebook as the precoding vector directly, and an identifier of the selected column vector is used for feedback. However, because a codebook space is limited, the precoding vector selected based on the codebook deviates greatly from the ideal precoding vector, resulting in a limited precoding effect. It can be learned that a new feedback mechanism is required to improve the precoding effect.

SUMMARY

To improve a precoding effect, embodiments of the present invention provide a channel information feedback method, a channel information determining method, a receive end device, a transmit end device, and a channel information feedback system. The technical solutions are as follows:

According to a first aspect, a channel information feedback method is provided, where the method includes:

generating at least one piece of description information for each of a plurality of subbands included in a wideband, where each piece of description information is used to describe a description vector of a channel matrix corresponding to the subband, the description information includes at least one of a vector parameter and a weighting parameter, the vector parameter is used to indicate at least two component vectors of the description vector, the weighting parameter is used to indicate a weight of each of the at least two component vectors, and the at least two component vectors are selected from a base codebook; and sending the at least one piece of description information.

According to the channel information feedback method provided in this embodiment of the present invention, the at least one piece of description information is generated and sent, each piece of description information is used to describe a description vector of the channel matrix corresponding to the subband, and a transmit end device may determine, based on each piece of description information, the description vector corresponding to the description information. At least one column vector is selected from the codebook for weighted combination to generate the description vector of the channel matrix. By comparison with the prior art in which a column vector in a codebook is directly used as a description vector, a codebook space can be enlarged in the technical solutions provided in this embodiment of the present invention, and a precoding effect can be improved when precoding is performed based on the description vector fed back in the technical solutions provided in this embodiment of the present invention.

In a possible design, the at least two component vectors include a starting vector and at least one offset vector, the vector parameter is used to indicate a basic vector parameter (l, m) of the starting vector and an offset parameter (a, b) of each offset vector, a basic vector parameter of each offset vector is $(l+aL, m+bM)$, $0 \le l \le O_1N_1-1$, $0 \le m \le O_2N_2-1$, L and M are preset positive integers, $L \le O_1$, $M \le O_2$, $$0 \le a \le \frac{O_1N_1 - 1 - l}{L}, 0 \le b \le \frac{O_2N_2 - 1 - m}{M},$$

and a and b are both integers and are not 0 at the same time. In this case, an offset step (L,M) may be preset in a standard.

In a possible design, the at least two component vectors include a starting vector and at least one offset vector, the vector parameter is used to indicate a basic vector parameter (l, m) of the starting vector, an offset step (L,M), and an offset parameter (a, b) of each offset vector, a basic vector parameter of each offset vector is $(l+aL, m+bM)$, $1 \le L \le O_1$, $M \le O_2$, $0 \le l \le O_1N_1-1$, $0 \le m \le O_2N_2-1$, $$0 \le a \le \frac{O_1N_1 - 1 - l}{L}, 0 \le b \le \frac{O_2N_2 - 1 - m}{M},$$

and a and b are both integers and are not 0 at the same time. In this case, the offset step (L,M) is one of a plurality of preset groups of offset steps.

In a possible design, the offset step (L,M) is an offset step corresponding to the basic vector parameter (l, m) of the starting vector in the plurality of preset groups of offset steps.

According to a second aspect, a channel information feedback method is provided, where the method includes:

receiving at least one piece of description information generated for each of a plurality of subbands included in a wideband, where each piece of description information is used to describe a description vector of a channel matrix corresponding to the subband, the description information includes at least one of a vector parameter and a weighting parameter, the vector parameter is used to indicate at least two component vectors of the description vector, the weighting parameter is used to indicate a weight of each of the at least two component vectors, and the at least two component vectors are selected from a base codebook; and determining, based on each piece of description information, the description vector corresponding to the description information.

According to the channel information determining method provided in this embodiment of the present invention, the at least one piece of description information is received, each piece of description information is used to describe a description vector of the channel matrix corresponding to the subband, and a transmit end device may determine, based on each piece of description information, the description vector corresponding to the description information. At least one column vector is selected from the codebook for weighted combination to generate the description vector of the channel matrix. By comparison with the prior art in which a column vector in a codebook is directly used as a description vector, a codebook space can be enlarged in the technical solutions provided in this embodiment of the present invention, and a precoding effect can be improved when precoding is performed based on the description vector fed back in the technical solutions provided in this embodiment of the present invention.

In a possible design, the at least two component vectors include a starting vector and at least one offset vector, the vector parameter is used to indicate a basic vector parameter (l, m) of the starting vector and an offset parameter (a, b) of each offset vector, a basic vector parameter of each offset vector is (l+aL, m+bM), $0 \leq l \leq O_1 N_1 - 1$, $0 \leq m \leq O_2 N_2 - 1$, L and M are preset positive integers, $L \leq O_1$, $M \leq O_2$, $$0 \leq a \leq \frac{O_1 N_1 - 1 - l}{L}, 0 \leq b \leq \frac{O_2 N_2 - 1 - m}{M},$$

and a and b are both integers and are not 0 at the same time. In this case, an offset step (L,M) may be preset in a standard.

In a possible design, the at least two component vectors include a starting vector and at least one offset vector, the vector parameter is used to indicate a basic vector parameter (l, m) of the starting vector, an offset step (L,M), and an offset parameter (a, b) of each offset vector, a basic vector parameter of each offset vector is (l+aL, m+bM), $1 \leq L \leq O_1$, $1 \leq M \leq O_2$, $0 \leq l \leq O_1 N_1 - 1$, $0 \leq m \leq O_2 N_2 - 1$, $$0 \leq a \leq \frac{O_1 N_1 - 1 - l}{L}, 0 \leq b \leq \frac{O_2 N_2 - 1 - m}{M},$$

and a and b are both integers and are not 0 at the same time. In this case, the offset step (L,M) is one of a plurality of preset groups of offset steps.

In a possible design, the offset step (L,M) is an offset step corresponding to the basic vector parameter (l, m) of the starting vector in the plurality of preset groups of offset steps.

According to a third aspect, a receive end device is provided, where the receive end device includes:

a generation module, configured to generate at least one piece of description information for each of a plurality of subbands included in a wideband, where each piece of description information is used to describe a description vector of a channel matrix corresponding to the subband, the description information includes at least one of a vector parameter and a weighting parameter, the vector parameter is used to indicate at least two component vectors of the description vector, the weighting parameter is used to indicate a weight of each of the at least two component vectors, and the at least two component vectors are selected from a base codebook; and a sending module, configured to send the at least one piece of description information.

In a possible design, the at least two component vectors include a starting vector and at least one offset vector, the vector parameter is used to indicate a basic vector parameter (l, m) of the starting vector and an offset parameter (a, b) of each offset vector, a basic vector parameter of each offset vector is (l+aL, m+bM), $0 \leq l \leq O_1 N_1 - 1$, $0 \leq m \leq O_2 N_2 - 1$, L and M are preset positive integers, $L \leq O_1$, $M \leq O_2$, $$0 \leq a \leq \frac{O_1 N_1 - 1 - l}{L}, 0 \leq b \leq \frac{O_2 N_2 - 1 - m}{M},$$

and a and b are both integers and are not 0 at the same time. In this case, an offset step (L,M) may be preset in a standard.

In a possible design, the at least two component vectors include a starting vector and at least one offset vector, the vector parameter is used to indicate a basic vector parameter (l, m) of the starting vector, an offset step (L,M), and an offset parameter (a, b) of each offset vector, a basic vector parameter of each offset vector is (l+aL, m+bM), $1 \leq L \leq O_1$, $1 \leq M \leq O_2$, $0 \leq l \leq O_1 N_1 - 1$, $0 \leq m \leq O_2 N_2 - 1$, $$0 \leq a \leq \frac{O_1 N_1 - 1 - l}{L}, 0 \leq b \leq \frac{O_2 N_2 - 1 - m}{M},$$

and a and b are both integers and are not 0 at the same time. In this case, the offset step (L,M) is one of a plurality of preset groups of offset steps.

In a possible design, the offset step (L,M) is an offset step corresponding to the basic vector parameter (l, m) of the starting vector in the plurality of preset groups of offset steps.

According to a fourth aspect, a receive end device is provided, where the receive end device includes:

a receiving module, configured to receive at least one piece of description information generated for each of a plurality of subbands included in a wideband, where each piece of description information is used to describe a description vector of a channel matrix corresponding to the subband, the description information includes at least one of a vector parameter and a weighting parameter, the vector parameter is used to indicate at least two component vectors of the description vector, the weighting parameter is used to indicate a weight of each of the at least two component vectors, and the at least two component vectors are selected from a base codebook; and a determining module, configured to determine, based on each piece of description information, the description vector corresponding to the description information.

In a possible design, the at least two component vectors include a starting vector and at least one offset vector, the vector parameter is used to indicate a basic vector parameter (l, m) of the starting vector and an offset parameter (a, b) of each offset vector, a basic vector parameter of each offset vector is (l+aL, m+bM), $0 \leq l \leq O_1 N_1 - 1$, $0 \leq m \leq O_2 N_2 - 1$, L and M are preset positive integers, $L \leq O_1$, $M \leq O_2$, $$0 \leq a \leq \frac{O_1 N_1 - 1 - l}{L}, 0 \leq b \leq \frac{O_2 N_2 - 1 - m}{M},$$

and a and b are both integers and are not 0 at the same time. In this case, an offset step (L,M) may be preset in a standard.

In a possible design, the at least two component vectors include a starting vector and at least one offset vector, the vector parameter is used to indicate a basic vector parameter (l, m) of the starting vector, an offset step (L,M), and an offset parameter (a, b) of each offset vector, a basic vector parameter of each offset vector is (l+aL, m+bM), $1 \leq L \leq O_1$, $1 \leq M \leq O_2$, $0 \leq l \leq O_1 N_1 - 1$, $0 \leq m \leq O_2 N_2 - 1$, $$0 \leq a \leq \frac{O_1 N_1 - 1 - l}{L}, 0 \leq b \leq \frac{O_2 N_2 - 1 - m}{M},$$

and a and b are both integers and are not 0 at the same time. In this case, the offset step (L,M) is one of a plurality of preset groups of offset steps.

In a possible design, the offset step (L,M) is an offset step corresponding to the basic vector parameter (l, m) of the starting vector in the plurality of preset groups of offset steps.

According to a fifth aspect, a channel information feedback system is provided.

In a possible implementation, the channel information feedback system includes the receive end device in any one of the third aspect and the possible designs of the third aspect and the transmit end device in any one of the fourth aspect and the possible designs of the fourth aspect.

The technical solutions provided in the embodiments of the present invention have the following beneficial effects:

According to the channel information feedback method, the channel information determining method, the receive end device, the transmit end device, and the channel information feedback system provided in the embodiments of the present invention, the receive end device generates and sends the at least one piece of description information for each of the plurality of subbands included in the wideband, each piece of description information is used to describe a description vector of the channel matrix corresponding to the subband, and the transmit end device may determine, based on each piece of description information, the description vector corresponding to the description information. At least one column vector is selected from the codebook for weighted combination to generate the description vector of the channel matrix. By comparison with the prior art in which a column vector in a codebook is directly used as a description vector, a codebook space can be enlarged in the technical solutions provided in the embodiments of the present invention, and a precoding effect can be improved when precoding is performed based on the description vector fed back in the technical solutions provided in the embodiments of the present invention.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

The technical solutions provided in the embodiments of the present invention are described in detail below with reference to the accompanying drawings.

Figure 1:
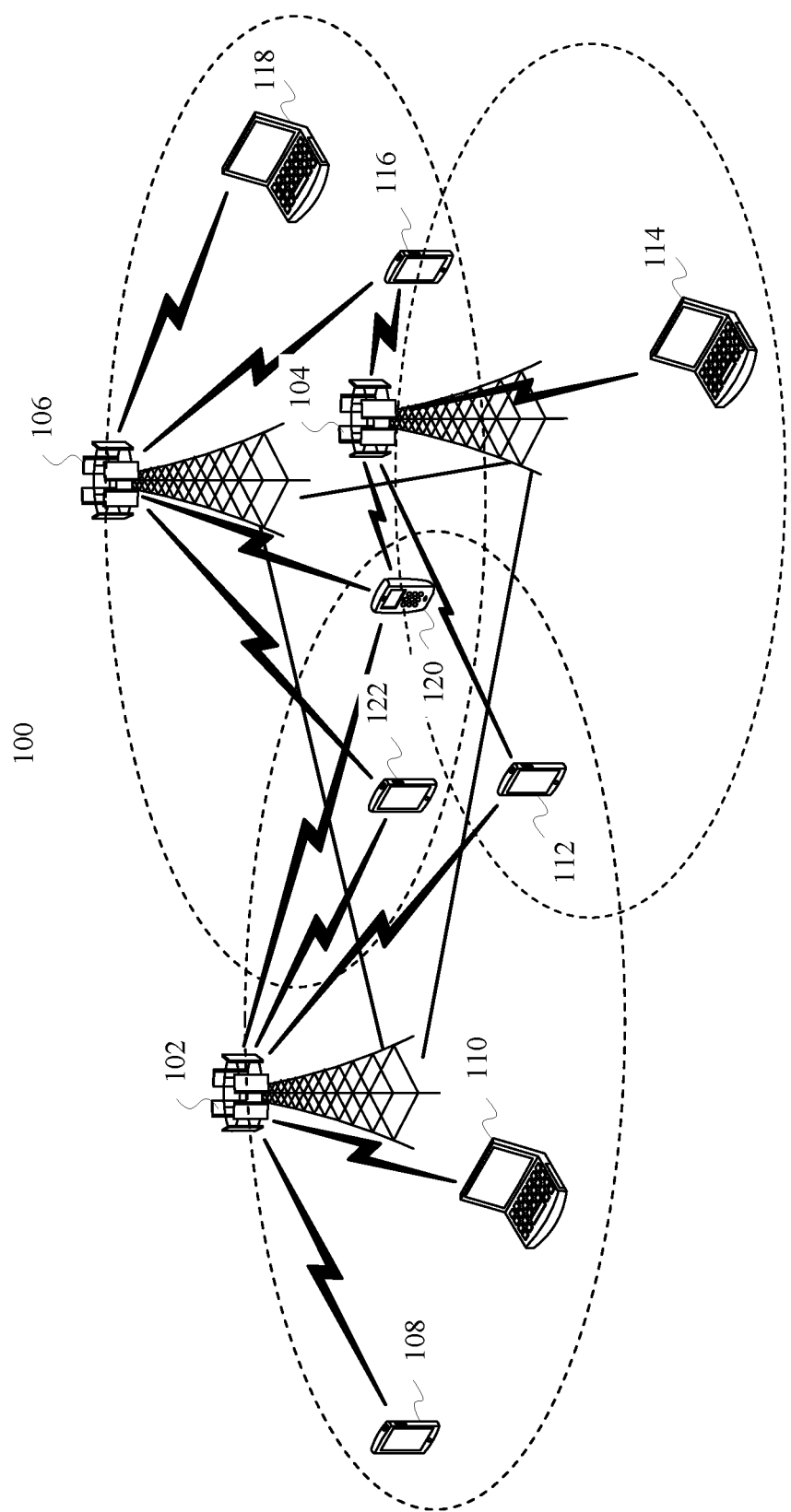
FIG. 1 is an example schematic diagram of a wireless communications network according to an embodiment of the present invention.

FIG. 1 is an example schematic diagram of a wireless communications network 100 according to an embodiment of the present invention. As shown in FIG. 1, the wireless communications network 100 includes base stations 102, 104, and 106 and terminal devices 108, 110, 112, 114, 116, 118, 120, and 122. The base stations 102, 104, and 106 may communicate with one another by using backhaul (backhaul) links (as shown by straight lines between the base stations 102, 104, and 106). The backhaul link may be a wired backhaul link (such as an optical fiber or a copper cable), or may be a wireless backhaul link (such as a microwave). The terminal devices 108, 110, 112, 114, 116, 118, 120, and 122 may communicate with the corresponding base stations 102, 104, and 106 by using radio links (as shown by fold lines between the base stations 102, 104, and 106 and the terminal devices 108, 110, 112, 114, 116, 118, 120, and 122).

The base stations 102, 104, and 106 are configured to provide wireless access services for the terminal devices 108, 110, 112, 114, 116, 118, 120, and 122. Specifically, each base station corresponds to one service coverage area (which may also be referred to as a cellular, as shown in each elliptical area in FIG. 1), and a terminal device entering the area may communicate with the base station by using a radio signal, to receive a wireless access service provided by the base station. The service coverage areas of the base stations may overlap, and a terminal device in an overlapping area may receive radio signals from a plurality of base stations. Therefore, the plurality of base stations may simultaneously provide services for the terminal device. For example, the plurality of base stations may provide services for the terminal device in the overlapping area by using a coordinated multipoint transmission/reception (Coordinated Multipoint Transmission/Reception, CoMP) technology. For example, as shown in FIG. 1, service coverage areas of the base station 102 and the base station 104 overlap, and the terminal device 112 is located in an overlapping area. Therefore, the terminal device 112 may receive radio signals from the base station 102 and the base station 104, and the base station 102 and the base station 104 may simultaneously provide services for the terminal device 112. For another example, as shown in FIG. 1, service coverage areas of the base station 102, the base station 104, and the base station 106 have a common overlapping area, and the terminal device 120 is located in the overlapping area. Therefore, the terminal device 120 may receive radio signals from the base stations 102, 104, and 106, and the base stations 102, 104, and 106 may simultaneously provide services for the terminal device 120.

Depending on a used wireless communication technology, the base station may also be referred to as a NodeB (NodeB), an evolved NodeB (evolved NodeB, eNodeB), an access point (Access Point, AP), or the like. In addition, based on sizes of provided service coverage areas, the base stations may be further classified into a macro base station for providing a macro cell (Macro cell), a micro base station for providing a micro cell (Pico cell), and a femto base station for providing a femto cell (Femto cell). As wireless communications technologies continue to evolve, future base stations may use other names.

The terminal devices 108, 110, 112, 114, 116, and 118 may be various wireless communications devices having a wireless communication function, for example, but not limited to, mobile cellular phones, cordless phones, personal digital assistants (Personal Digital Assistant, PDA), smartphones, notebook computers, tablet computers, wireless data cards, wireless modems (Modulator and Demodulator, Modem), or wearable devices such as smartwatches. With emergence of an Internet of things (Internet of Things, IOT) technology, more devices previously having no communication function, for example, but not limited to, a household appliance, a transportation vehicle, a tool device, a service device, and a service facility, start to be equipped with wireless communications units, to obtain the wireless communication function, so that the devices can access a wireless communications network and be remotely controlled. Such devices have the wireless communication function because they are equipped with the wireless communications units, and therefore, also belong to wireless communications devices. In addition, the terminal devices 108, 110, 112, 114, 116, and 118 may also be referred to as mobile stations, mobile devices, mobile terminals, wireless terminals, handheld devices, clients, or the like.

The base stations 102, 104, and 106 and the terminal devices 108, 110, 112, 114, 116, 118, 120, and 122 all may be equipped with a plurality of antennas, to support a MIMO (multiple-input multiple-output, Multiple-Input Multiple-Output) technology. Further, the terminal devices 108, 110, 112, 114, 116, 118, 120, and 122 can support both a single-user MIMO (Single-User MIMO, SU-MIMO) technology and a multi-user MIMO (Multi-User MIMO, MU-MIMO) technology. The MU-MIMO technology may be implemented based on a space division multiple access (Space Division Multiple Access, SDMA) technology. Because a plurality of antennas are configured, the base stations 102, 104, and 106 and the terminal devices 108, 110, 112, 114, 116, 118, 120, and 122 may further flexibly support a single-input single-output (Single-Input Single-Output, SISO) technology, a single-input multiple-output (Single-Input Multiple-Output, SIMO) technology, and a multiple-input-single-output (Multiple Input Single Output, MISO) technology, to implement various diversity technologies (for example, but not limited to, transmit diversity and receive diversity) and multiplexing technologies. The diversity technologies may include, for example, but not limited to, a transmit diversity (Transmit Diversity, TD) technology and a receive diversity (Receive Diversity, RD) technology. The multiplexing technology may be a spatial multiplexing (Spatial Multiplexing) technology. In addition, the foregoing technologies may further include a plurality of implementation solutions. For example, currently, frequently used transmit diversity may include, for example, but not limited to, diversity manners such as space-time transmit diversity (Space-Time Transmit Diversity, STTD), space-frequency transmit diversity (Space-Frequency Transmit Diversity, SFTD), time switched transmit diversity (Time Switched Transmit Diversity, TSTD), frequency switched transmit diversity (Frequency Switched Transmit Diversity, FSTD), orthogonal transmit diversity (Orthogonal Transmit Diversity, OTD), and cyclic delay diversity (Cyclic Delay Diversity, CDD), and diversity manners obtained by deriving, evolving, and combining the foregoing diversity manners. For example, currently, transmit diversity manners such as space time block coding (Space Time Block Coding, STBC), space frequency block coding (Space Frequency Block Coding, SFBC), and the CDD are used in an LTE (long term evolution, Long Term Evolution) standard.

In addition, the base station 102 and the terminal devices 104 to 110 may communicate by using various wireless communications technologies, for example, but not limited to, a time division multiple access (Time Division Multiple Access, TDMA) technology, a frequency division multiple access (Frequency Division Multiple Access, FDMA) technology, a code division multiple access (Code Division Multiple Access, CDMA) technology, a time division-synchronous code division multiple access (Time Division-Synchronous Code Division Multiple Access, TD-SCDMA) technology, an orthogonal frequency division multiple access (Orthogonal FDMA, OFDMA) technology, a single carrier frequency division multiple access (Single Carrier FDMA, SC-FDMA) technology, a space division multiple access (Space Division Multiple Access, SDMA) technology, and evolved and derived technologies of these technologies. The foregoing wireless communications technologies are adopted as radio access technologies (Radio Access Technology, RAT) in many wireless communications standards, thereby constructing various wireless communications systems (or networks) well known today, including but not limited to, global system for mobile communications (Global System for Mobile Communications, GSM), CDMA 2000, wideband CDMA (Wideband CDMA, WCDMA), Wi-Fi defined in 802.11 series of standards, worldwide interoperability for microwave access (Worldwide Interoperability for Microwave Access, WiMAX), long term evolution (Long Term Evolution, LTE), LTE-Advanced (LTE-Advanced, LTE-A), and evolved systems of these wireless communications systems. The wireless communications network shown in FIG. 1 may be any system or network in the foregoing wireless communications system.

The technical solutions provided in this embodiment of the present invention are applicable to the foregoing various wireless communications technologies and wireless communications systems, unless otherwise specified. In addition, terms "system" and "network" can be interchanged.

It should be noted that the wireless communications network 100 shown in FIG. 1 is merely used as an example and is not intended to limit the technical solutions of the present invention.

Usually, in a communication process, a receive end device determines a channel matrix based on a reference signal transmitted by a transmit end device, determines a description matrix of the channel matrix based on the channel matrix and a codebook, and feeds back the description matrix to the transmit end device. The transmit end device precodes to-be-transmitted data based on the description matrix, and sends precoded data to the receive end device. In this specification, the receive end device may be the terminal devices 108, 110, 112, 114, 116, 118, 120, and 122 shown in FIG. 1, and the transmit end device may be the base stations 102, 104, and 106 shown in FIG. 1; or the receive end device may be the base stations 102, 104, and 106 shown in FIG. 1, and the transmit end device may be the terminal devices 108, 110, 112, 114, 116, 118, 120, and 122 shown in FIG. 1. An embodiment of the present invention provides channel information feedback and determining solutions, and a corresponding receive end device and a corresponding transmit end device. The following describes in detail the technical solutions provided in this embodiment of the present invention.

A base codebook is usually associated with an antenna array. For example, many parameters in an expression of the base codebook may be construed as being used for representing different attributes of the antenna array. Therefore, to help understand the base codebook provided in this embodiment of the present invention, the following describes the base codebook with reference to the antenna array. However, a person skilled in the art should understand that the base codebook provided in this embodiment of the present invention is not limited to a particular antenna array. In a specific implementation process, an appropriate antenna array may be selected based on a specific requirement, and the various parameters in the base codebook provided in this embodiment of the present invention are set based on the selected antenna array, so that a description vector is determined by using the base codebook provided in this embodiment of the present invention.

Figure 2A:
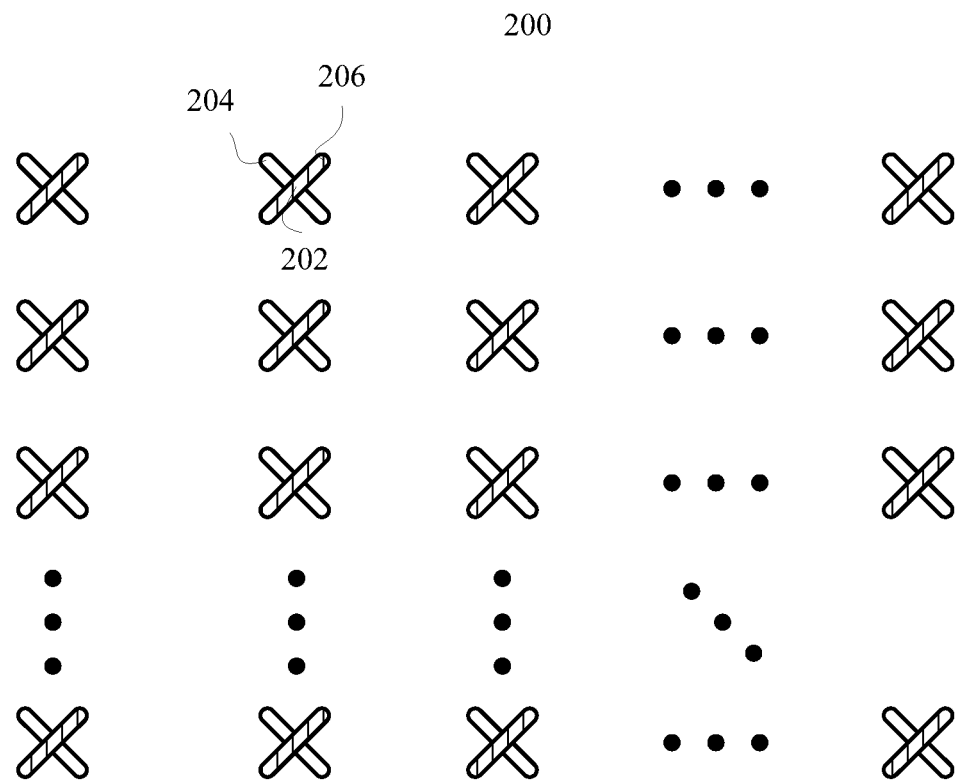
FIG. 2A is an example schematic diagram of an antenna array according to an embodiment of the present invention.

FIG. 2A is an example schematic diagram of an antenna array 200 according to an embodiment of the present invention. As shown in FIG. 2A, the antenna array 200 includes a plurality of array elements 202, and the array elements 202 are arranged in a matrix manner. Specifically, each row of the matrix includes a plurality of array elements 202, and each column includes a plurality of array elements 202. Each array element 202 includes two antennas: an antenna 204 working in a first polarization direction and an antenna 206 working in a second polarization direction.

Figure 2B:
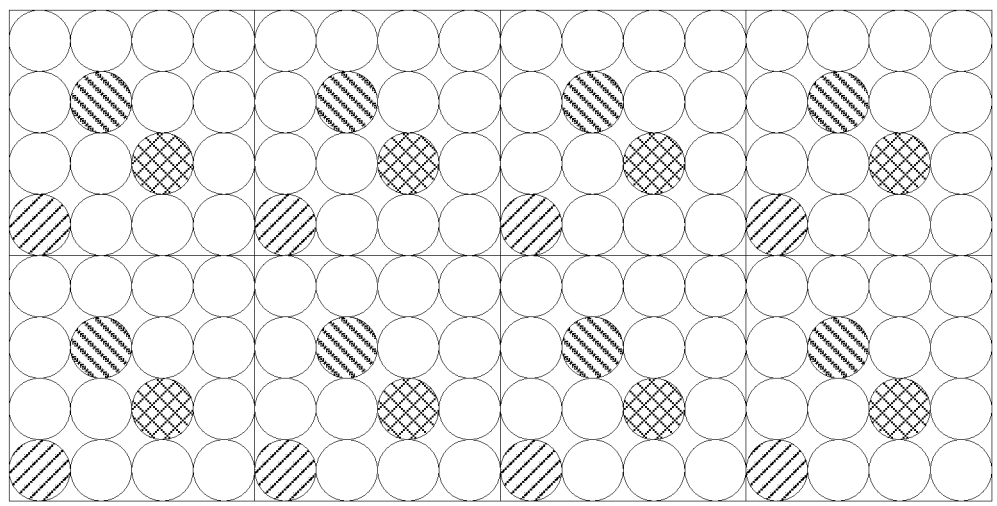
FIG. 2B is a schematic diagram of a base codebook according to an embodiment of the present invention.

FIG. 2B is a schematic diagram of a base codebook according to an embodiment of the present invention. The base codebook includes a plurality of basic vectors, and each basic vector is:

$$c_{x,y} = v_x \otimes u_y,$$

where $\otimes$ represents a Kronecker product, and $$v_x = \begin{bmatrix} 1 & e^{j\frac{2\pi x}{O_1 N_1}} & \ldots & e^{j\frac{2\pi x(N_1-1)}{O_1 N_1}} \end{bmatrix}$$

$$u_y = \begin{bmatrix} 1 & e^{j\frac{2\pi y}{O_2 N_2}} & \ldots & e^{j\frac{2\pi y(N_2-1)}{O_2 N_2}} \end{bmatrix}$$

where (x, y) represents a basic vector parameter, $N_1$, $N_2$, $O_1$ and $O_2$ are preset values, $N_1$, $N_2$, $O_1$, and $O_2$ are all positive integers, $0 \le x \le O_1 N_1 - 1$, $0 \le y \le O_2 N_2 - 1$.

Specifically, $v_x$ may be, for example, but not limited to, a first-dimension discrete Fourier transform (Discrete Fourier Transform, DFT) vector, $N_1$ is a first-dimension array element quantity, $O_1$ is a first-dimension over-sampling multiple, $u_y$ may be, for example, but not limited to, a second-dimension DFT vector, $N_2$ is a second-dimension array element quantity, and $O_2$ is a second-dimension over-sampling multiple. FIG. 2B is a schematic diagram of a base codebook constructed when the first-dimension array element quantity $N_1=4$, the over-sampling multiple $O_1=4$, the second-dimension array element quantity $N_2=2$, and the over-sampling multiple $O_2=4$. Each dot shown in FIG. 2B represents one basic vector in the base codebook.

In a specific implementation process, in the base codebook, $O_1$ and $O_2$ may be construed as being used for over-sampling, $N_1$ and $N_2$ may be used to indicate a quantity of array elements 202 in each row (or column) and a quantity of array elements 202 in each column (or row) in the antenna array 200.

Figure 2C:
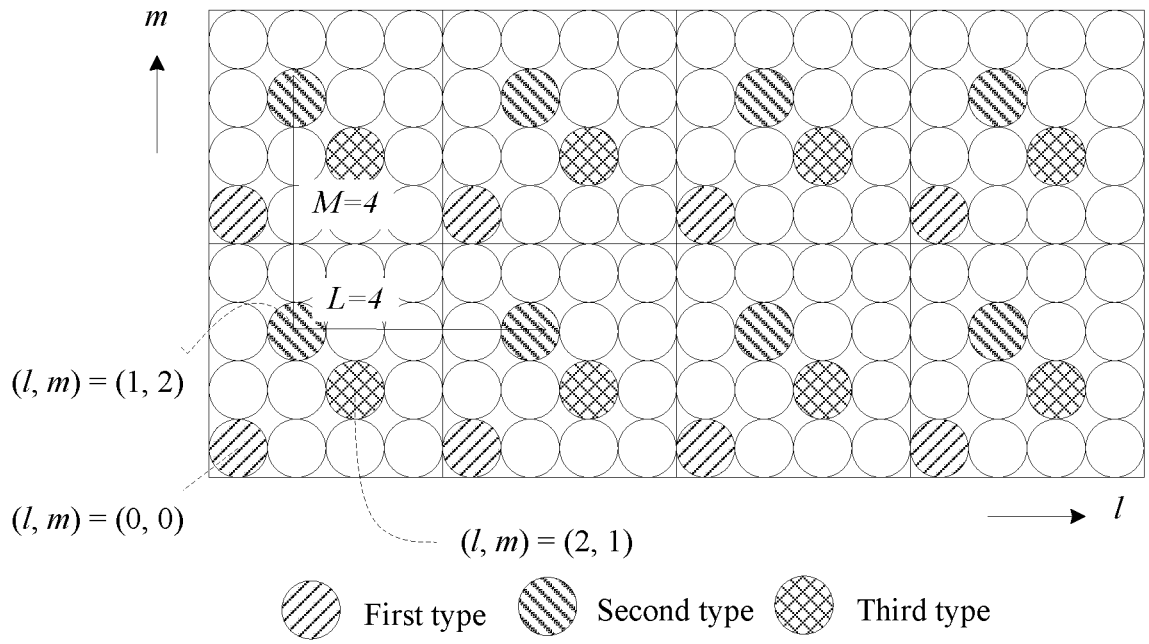
FIG. 2C is another schematic diagram of a base codebook according to an embodiment of the present invention.

FIG. 2C is another schematic diagram of the base codebook. In the schematic diagram, the basic vectors in the base codebook are indicated in a coordinate system in which a lateral axis is l and a longitudinal axis is m. (l,m) is a basic vector parameter, l and m are both nonnegative integers, and (l,m) is also used to indicate location information of a basic vector in the base codebook, which is denoted as a basic vector (l,m). As shown in FIG. 2B, (l,m)=(0, 0), (l,m)=(1, 2), and (l,m)=(2, 1) indicate corresponding basic vectors in the figure. (L,M) indicates an offset step between two basic vectors, L and M are positive integers, L is an offset step of the two basic vectors in a lateral axis direction, and M is an offset step of the two basic vectors in a longitudinal axis direction. As shown in FIG. 2C, L=4 indicates that the offset step between the two basic vectors in the lateral axis direction is 4, and M=4 indicates that the offset step between the two basic vectors in the longitudinal axis direction is 4. After location information (l,m) of a basic vector and an offset step (L,M) are determined, the basic vector (l,m) is used as a starting vector (l,m), and a vector group including the starting vector (l,m) and at least one offset vector ($l_i$, $m_i$) may be determined. The at least one offset vector ($l_i$, $m_i$) may be any basic vector in the base codebook except the starting vector (l,m). A basic vector parameter of each offset vector may be expressed as: $l_i = l + aL, m_i = m + bM$.

$$0 \le a \le \frac{O_1 N_1 - 1 - l}{L}, \ 0 \le b \le \frac{O_2 N_2 - 1 - m}{M},$$

a and b are both nonnegative integers and are not zero at the same time, and (a, b) is an offset parameter of each offset vector. For example, when the starting vector is (0, 0), namely, a vector represented by the first dot of a first type in the lower left corner shown in FIG. 2C, and the offset step is (4, 4), ($O_1 N_1 = 16$ and $O_2 N_2 = 8$ are already shown in the description of FIG. 2B), $$0 \leq a \leq \frac{15}{4}, 0 \leq b \leq \frac{7}{4},$$

a value of a may be {0, 1, 2, 3}, a value of b may be {0, 1}, and values of the offset parameter (a, b) satisfying the condition are (1, 0), (2, 0), (3, 0), (0, 1), (1, 1), (2, 1), and (3, 1). In other words, offset vectors satisfying the condition are a basic vector (4, 0), a basic vector (8, 0), a basic vector (12, 0), a basic vector (0, 4), a basic vector (4, 4), a basic vector (8, 4), and a basic vector (12, 4), namely, vectors represented by other dots of the first type shown in FIG. 2C. It should be noted that the basic vectors in the base codebook are indicated in the coordinate system herein for ease of describing location relationships between different vectors, instead of limiting the protection scope of the present invention. In a specific implementation process, a person skilled in the art may use other description manners based on actual requirements. This is not limited herein.

Figure 3:
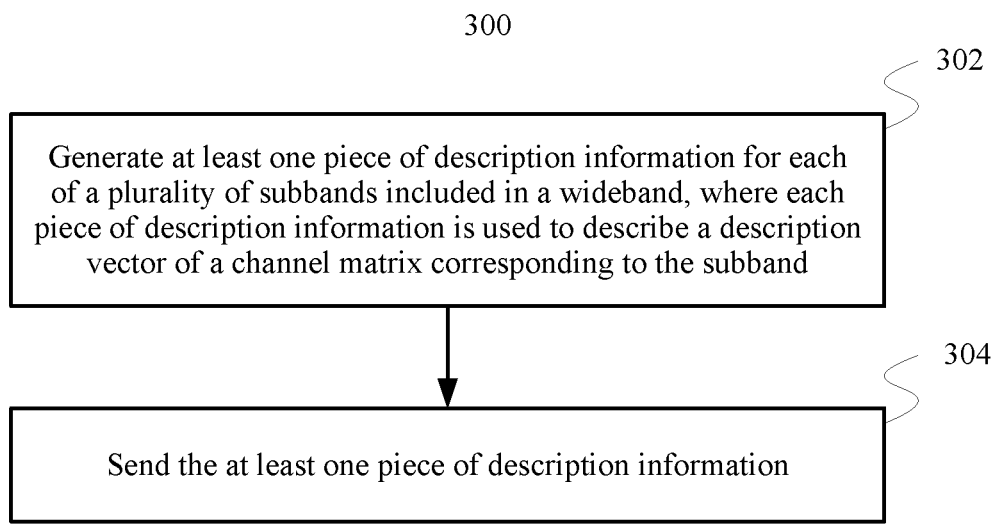
FIG. 3 is an example flowchart of a channel information feedback method according to an embodiment of the present invention.

FIG. 3 is a flowchart of a channel information feedback method 300 according to an embodiment of the present invention. In a specific implementation process, the method 300 may be performed by a receive end device.

Step 302: Generate at least one piece of description information for each of a plurality of subbands included in a wideband, where each piece of description information is used to describe a description vector of a channel matrix corresponding to the subband, the description information includes at least one of a vector parameter and a weighting parameter, the vector parameter is used to indicate at least two component vectors of the description vector, the weighting parameter is used to indicate a weight of each of the at least two component vectors, and the at least two component vectors are selected from a base codebook.

Step 304: Send the at least one piece of description information.

In the method 300, the description information includes at least one of the vector parameter and the weighting parameter, the vector parameter is used to indicate the at least two component vectors of the description vector, the weighting parameter is used to indicate the weight of each of the at least two component vectors, and the at least two component vectors are selected from the base codebook. In the method 300, the wideband may be a frequency band range corresponding to an entire system bandwidth, and the subband may be a frequency band range corresponding to a part of the system bandwidth. For example, if the entire system bandwidth is 20 M, the wideband may be a frequency band of 20 M corresponding to the entire system bandwidth, and the subband may be a part of the entire system bandwidth, for example, 5 M. The channel matrix corresponding to the subband may also be referred to as a subband channel matrix. It should be further noted that in addition to generating at least one piece of description information for each of the plurality of subbands included in the wideband, at least one piece of description information may be generated for a combined subband. The combined subband includes a plurality of continuous subbands in the wideband. For example, the wideband includes a subband 1, a subband 2, a subband 3, a subband 4, and a subband 5, and the combined subband may include the subband 1 and the subband 2.

In a specific implementation process, the description vector, namely, an ideal precoding vector, may be obtained by using various methods, and description vectors obtained by using different methods may be different. For example, the description vector may be obtained by performing singular value decomposition (Singular Value Decomposition, SVD) on the channel matrix. Specifically, if singular value decomposition (Singular Value Decomposition, SVD) is performed on the channel matrix, the channel matrix may be decomposed into a form of a product of a left unitary matrix, a diagonal matrix, and a right unitary matrix. In a specific implementation process, a conjugate transpose matrix of the right unitary matrix may be used as a description matrix, and a column vector of the description matrix may be used as a description vector. In addition, the description matrix obtained based on singular value decomposition may alternatively be obtained by, for example, but not limited to, performing eigenvalue decomposition on a matrix related to the channel matrix. In a specific implementation process, a specific value and an obtaining method of the description vector may be determined based on an overall requirement of a system design. Technical details about the description vector are clearly described in the prior art. Therefore, the details are not described herein.

After the description vector is obtained, the description vector may be approximated in a form of a weighted sum of a plurality of component vectors, to be specific:

$$p \approx \sum_{k=1}^{K} x_k c_k$$

where p represents the description vector, $c_k$ represents a component vector k, and $x_k$ represents a weight of the component vector k. In a specific implementation process, a quantity K (K is a positive integer) of component vectors may be set based on a specific requirement (for example, but not limited to, an accuracy requirement). For example, the quantity of component vectors may be preset.

In a possible design, the at least two component vectors include a starting vector and at least one offset vector, the vector parameter includes a basic vector parameter (l, m) of the starting vector and an offset parameter (a, b) of each offset vector, and a basic vector parameter of each offset vector is (l+aL, m+bM). In this case, an offset step (L,M) may be preset in a standard. It may be understood that before generating the description information, the receive end device needs to determine the basic vector parameter (l, m) of the starting vector and the offset parameter (a, b) of each offset vector, that is, determine the starting vector and the at least one offset vector. As mentioned above, the base codebook includes a plurality of basic vectors. In these basic vectors, a basic vector closest to the description vector of the subband channel matrix may be selected as the starting vector. Location information (l, m) of the closest basic vector in the base codebook may be determined as the basic vector parameter (l, m) of the starting vector. Closeness of the basic vector in the base codebook to the description vector of the subband channel matrix may be specifically represented as an inner product of the basic vector and the description vector. For example, the receive end device obtains a description vector of the subband channel matrix based on the subband channel matrix, and calculates inner products of the description vector and a plurality of basic vectors in the base codebook. A basic vector corresponding to a largest inner product may be determined as a starting vector, and a basic vector parameter corresponding to the basic vector may be determined as a basic vector parameter of the starting vector. It should be noted that the foregoing description of the starting vector is merely an example, and is not intended to limit the protection scope of the present invention. In a specific implementation process, a person skilled in the art may select, based on a specific requirement, an appropriate method for determining a starting vector.

After determining the starting vector, the receive end device may determine, in the base codebook based on the starting vector and the offset step (L,M), a vector group including the starting vector and at least one offset vector. For a specific method for determining the vector group, refer to the description of FIG. 2B. Details are not described herein again. After the vector group is determined, a component vector for describing a description vector of the subband channel matrix needs to be selected from the determined vector group. A method for selecting a component vector may be, for example, but not limited to, a method described below. For example, each vector in the vector group is used as a basis, and a description vector of the subband channel matrix is mapped to each basis in the vector group. The first K (K is a positive integer greater than 2) largest components and basis vectors corresponding to the components are selected based on values of components that are of the description vector and that are on the bases. The K basis vectors are K component vectors that need to be selected, and the K largest components are weights corresponding to the component vectors. Alternatively, each vector in the vector group is used as a basis, and a description vector of the channel matrix is mapped to each basis in the vector group. A largest component and a basis vector corresponding to the component are selected based on values of components that are of the description vector and that are on the bases. The basis vector is used as a selected first component vector. Then the selected largest component is deleted from the description vector, and the selection operation is repeated, to select a second component vector, until K component vectors are obtained. Components corresponding to the K component vectors are weights of the component vectors. It may be understood that the K component vectors selected by using the method include the starting vector and (K−1) offset vectors, and (K−1) offset parameters (a, b) corresponding to the (K−1) offset vectors are offset parameters that are of offset vectors and that need to be determined by the receive end device. In addition, the K component vectors correspond to K weighting parameters $x_k$, used to indicate the weights of the K component vectors. It should be noted that a specific quantity of selected component vectors herein may be determined in a communication protocol, or may be determined based on an actual performance requirement of a communications system. This is not limited herein.

In a possible design, the at least two component vectors include a starting vector and at least one offset vector, and the vector parameter includes a basic vector parameter (l, m) of the starting vector, an offset step (L,M), and an offset parameter (a, b) of each offset vector. A basic vector parameter of each offset vector is (l+aL, m+bM). A process of determining the basic vector parameter (l, m) of the starting vector and the offset parameter (a, b) of each offset vector is described in detail above, and details are not described herein again. In this case, the offset step (L,M) is selected from a preset offset step value set. The preset offset step value set herein may be preset in a standard, or may be preset by different receive end devices based on performance of the receive end devices, or may be determined by the receive end device and a transmit end device through negotiation. In other words, a value of the offset step (L,M) carried in the description information generated by the receive end device may be selected from the preset offset step value set. For example, if the preset offset step (L,M) value set is (1, 1), (2, 1), (2, 3), and (4, 4), the value of the offset step (L,M) is selected from the four values. It should be noted that when the offset step value set is preset in a standard, the offset step (L,M) carried in the description information generated by the receive end device may be an index of the offset step (L,M). When the offset step value set is preset by different receive end devices based on performance of the receive end devices, the offset step (L,M) carried in the description information generated by the receive end device may be a value of the offset step. In a specific implementation process, a method for selecting an offset step (L,M) from the offset step value set may be as follows: The receive end device sequentially determines corresponding vector groups based on values of (L,M) in the offset step set and the starting vector (l,m), and then selects, based on a to-be-described description vector of the subband channel matrix, an optimal vector group for describing the description vector. A criterion for selecting an optimal vector group may be, for example, but not limited to, a least square criterion and a maximum inner product criterion. The maximum inner product criterion is used as an example. One of a plurality of vector groups that are determined based on different offset steps (L,M) is selected. K component vectors of the description vector (the description vector is referred to as an original description vector below) and a weight corresponding to each component vector may be selected from the vector group with reference to the method described above. Weighted summation is performed on the K component vectors to obtain an estimated description vector, and an inner product of the original description vector and the estimated description vector is calculated. The foregoing operations are repeated for other vector groups, to obtain a plurality of inner products. Based on this, a vector group corresponding to a largest inner product is selected as the optimal vector group. After the optimal vector group is selected, an offset step (L,M) corresponding to the optimal vector group is recorded, and the offset step (L,M) is an offset step that needs to be selected. It can be learned that the value of the offset step (L,M) is selected from the preset offset step value set, so that a calculation amount of the receive end device when determining the offset step (L,M) can be reduced, and accuracy of each piece of description information for describing the description vector of the subband channel matrix can be improved.

Further, the offset step (L,M) may correspond to the basic vector parameter (l,m) of the starting vector. Herein, a correspondence between the offset step (L,M) and the basic vector parameter (l,m) of the starting vector may be determined in a communication protocol, or may be determined based on an actual system performance requirement. In this case, basic vector parameters (l,m) of starting vectors may be in a one-to-one correspondence with offset steps (L,M), or a plurality of basic vector parameters (l,m) of starting vectors may correspond to one offset step (L,M). For example, when the basic vector parameter (l,m) of the starting vector is (0, 0), a corresponding offset step (L,M) is (4, 4), or when basic vector parameters (l,m) of starting vectors are (0, 0), (1, 1), and (2, 2), corresponding offset steps (L,M) are all (4, 4). In other words, when the receive end device generates a piece of description information, if the receive end device determines that the basic vector parameter that is of the starting vector and that needs to be carried is (0, 0), an offset step that needs to be carried is correspondingly determined as (4, 4), or if the receive end device determines that the basic vector parameter that is of the starting vector and that needs to be carried is one of (0, 0), (1, 1), and (2, 2), offset parameters that need to be carried are all (4, 4). It may be understood that when there is a correspondence between the offset step (L,M) and the basic vector parameter (l,m) of the starting vector, the vector parameter carried in the description information generated by the receive end device may be the basic vector parameter (l,m) of the starting vector and the offset parameter (a, b) of each offset vector. In other words, information about the offset step (L,M) does not need to be carried, because the information about the offset step (L,M) can be determined based on the basic vector parameter (l,m) and the correspondence. It can be easily learned that the offset step (L,M) corresponds to the basic vector parameter (l,m) of the starting vector, and the receive end device can quickly determine the offset step (L,M) after determining the basic vector parameter (l,m) of the starting vector. This reduces a calculation amount of the receive end device, and further helps reduce feedback overheads, thereby improving efficiency of the receive end device.

In the method 300, the description information includes at least one of the vector parameter and the weighting parameter, and the weighting parameter is used to indicate the weight of each of the at least two component vectors. A method for determining the weighting parameter is described in detail above, and details are not described herein again.

It should be noted that in a specific implementation process, component vector determining and indication periods may be the same as or may be different from weight determining and indication periods. For example, the component vector determining and indication periods may be longer or shorter than the weight determining and indication periods. In this case, component vector determining and indication operations and weight determining and indication operations in the method 300 should be construed as being completed within a same feedback period, or being completed within different feedback periods. In other words, one piece of description information generated by the receive end device includes at least one of a vector parameter and a weighting parameter. Actually, in the prior art, a codebook may be indicated in the following form:

$$W=W_1W_2$$

where $W_1$ may be referred to as a long-term/wideband codebook, and $W_2$ may be referred to as a short-term/narrowband codebook. In the technical solutions provided in this embodiment of the present invention, for component vector determining and indication manners, refer to determining and indication manners of $W_1$ in the prior art. For weight determining and indication manners, refer to determining and indication manners of $W_2$ in the prior art. These determining and indication manners should also be construed as falling within the scope of the method 300.

In a specific implementation process, in step 304, the receive end device sends the description information to the transmit end device by using determined signaling. It may be understood that the description information may be a set of description information of the channel matrices corresponding to all the subbands. In other words, the description information generated for the channel matrices corresponding to all the subbands are jointly sent to the transmit end device by using the determined signaling. In addition, each subband may have a plurality of pieces of description information. These pieces of description information are also jointly sent to the transmit end device by using the determined signaling. The description information may be sent by using one piece of the following signaling:
 physical layer signaling;
 media access control layer signaling; and
 radio resource control signaling.

The physical layer signaling is also referred to as layer-1 (Layer 1, L1) signaling, and usually may be carried in a control part in a physical layer frame. A typical example of the L1 signaling is downlink control information (Downlink Control Information, DCI) carried on a physical downlink control channel (Physical Downlink Control Channel, PDCCH) and uplink control information (Uplink Control Information, UCI) carried on a physical uplink control channel (Physical Uplink Control Channel, PUCCH) defined in an LTE standard. In some cases, the L1 signaling may alternatively be carried in a data part in a physical layer frame. It can be easily learned that a sending period or a signaling period of the L1 signaling is usually a period of the physical layer frame. Therefore, the signaling is usually used to implement some dynamic control, to transmit some frequently changed information. For example, resource allocation information may be transmitted by using the physical layer signaling.

The media access control (Media Access Control, MAC) layer signaling is layer-2 (Layer 2) signaling, and usually may be carried in, for example, but not limited to, a frame header of a layer-2 frame. The frame header may further carry, for example, but not limited to, information such as a source address and a destination address. In addition to the frame header, the layer-2 frame usually further includes a frame body. In some cases, the L2 signaling may alternatively be carried in the frame body of the layer-2 frame. A typical example of the layer-2 signaling is signaling carried in a frame control (Frame Control) field in a frame header of a MAC frame in 802.11 series of standards, or a MAC control entity (Control Entity, MAC) defined in some protocols. The layer-2 frame usually may be carried in a data part in a physical layer frame. The foregoing precoding configuration information may alternatively be sent by using other layer-2 signaling than the media access control layer signaling.

The radio resource control (Radio Resource Control, RRC) signaling is layer-3 (Layer 3) signaling, and is usually some control messages. The L3 signaling usually may be carried in the frame body of the layer-2 frame. A sending period or a control period of the L3 signaling is usually relatively long, and is suitable for sending some information that does not frequently change. For example, in some existing communications standards, L3 signaling is usually used to carry some configuration information. The foregoing precoding configuration information may alternatively be sent by using other layer-3 signaling than the RRC signaling.

The foregoing description is merely a principle description of the physical layer signaling, the MAC layer signaling, the RRC signaling, the layer-1 signaling, the layer-2 signaling, and the layer-3 signaling. For specific details of the three types of signaling, refer to the prior art. Therefore, the details are not described herein.

In a specific implementation process, the description vector approximated by the weighted sum of the plurality of component vectors may be used by the transmit end device as a precoding vector to precode to-be-transmitted data. It should be noted that in some cases, the description vector approximated by the weighted sum of the plurality of component vectors may need to be reconstructed before being used for precoding. For example, in an MU-MIMO scenario, the transmit end device needs to perform a reconstruction operation based on approximated description vectors of a plurality of simultaneously scheduled receive end devices, to obtain a precoding vector truly used for precoding for each receive end device. An objective of the reconstruction may be, for example, but not limited to, setting precoding vectors of different receive end devices to be mutually orthogonal, to reduce interference of a signal sent to one receive end device to another receive end device. The reconstruction process may be performed based on a plurality of algorithms, for example, but not limited to, a zero-forcing (Zero-Forcing, ZF) algorithm, a minimum mean square error (Minimum Mean Square Error, MMSE) algorithm, and a block diagonalization (Block Diagonalization, BD) algorithm.

It can be easily learned that the at least one piece of description information is sent by using the signaling, each piece of description information is used to describe a description vector of the channel matrix corresponding to the subband, and the receive end device may determine, based on each piece of description information, the description vector corresponding to the description information. At least one column vector is selected from the codebook for weighted combination to generate the description vector of the channel matrix. By comparison with the prior art in which a column vector in a codebook is directly used as a description vector, a codebook space can be enlarged in the technical solutions provided in the technical solutions provided in this embodiment of the present invention, and a precoding effect can be improved when precoding is performed based on the description vector fed back in the technical solutions provided in this embodiment of the present invention.

In addition, in the technical solutions provided in this embodiment of the present invention, the description vector of the channel matrix corresponding to each subband is fed back in the subband, thereby improving feedback accuracy of the channel matrix corresponding to the subband.

Figure 4:
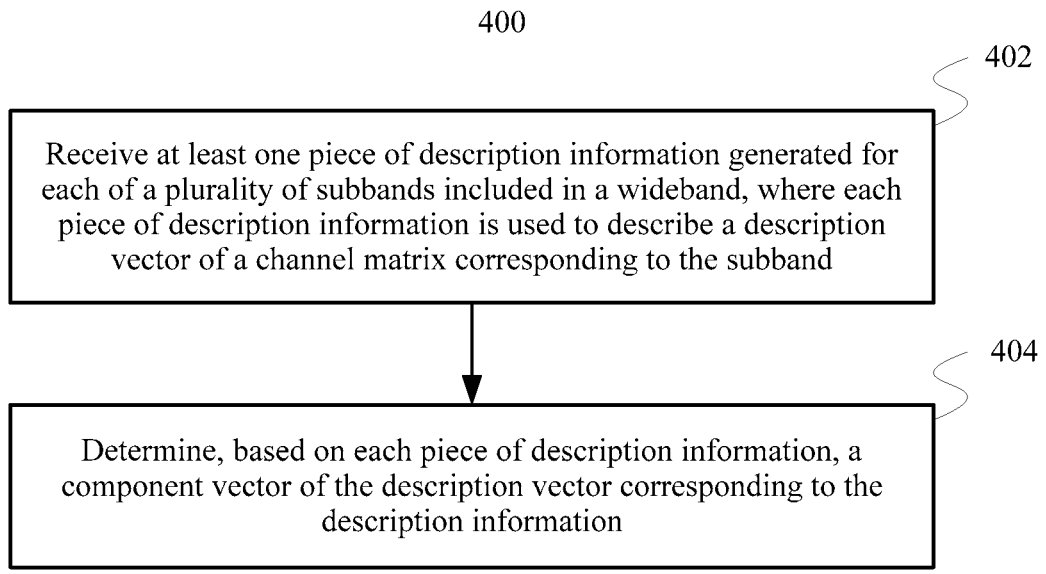
FIG. 4 is an example flowchart of a channel information determining method according to an embodiment of the present invention.

FIG. 4 is a flowchart of a channel information determining method 400 according to an embodiment of the present invention. In a specific implementation process, the method 400 may be performed by a transmit end device.

Step 402: Receive at least one piece of description information generated for each of a plurality of subbands included in a wideband, where each piece of description information is used to describe a description vector of a channel matrix corresponding to the subband, the description information includes at least one of a vector parameter and a weighting parameter, the vector parameter is used to indicate at least two component vectors of the description vector, the weighting parameter is used to indicate a weight of each of the at least two component vectors, and the at least two component vectors are selected from a base codebook.

Step 404: Determine, based on each piece of description information, the description vector corresponding to the description information.

In a specific implementation process, the at least two component vectors may be determined by using the vector parameter, the weight of each of the at least two component vectors is determined by using the weighting parameter, and then weighted summation is performed on these component vectors based on the respective weights of the component vectors, to determine the description vector.

Specific technical content in the method 400 is clearly described above with reference to the accompanying drawings, for example, but not limited to, FIG. 2C and FIG. 3. Therefore, details are not described herein again.

It can be learned that the at least one piece of description information is received, each piece of description information is used to describe a description vector of the channel matrix corresponding to the subband, and the transmit end device may determine, based on each piece of description information, the description vector corresponding to the description information. At least one column vector is selected from the codebook for weighted combination to generate the description vector of the channel matrix. By comparison with the prior art in which a column vector in a codebook is directly used as a description vector, a codebook space can be enlarged in the technical solutions provided in this embodiment of the present invention, and a precoding effect can be improved when precoding is performed based on the description vector fed back in the technical solutions provided in this embodiment of the present invention.

In addition, in the technical solutions provided in this embodiment of the present invention, the description vector of the channel matrix corresponding to each subband is fed back in the subband, thereby improving feedback accuracy of the channel matrix corresponding to the subband.

Figure 5:
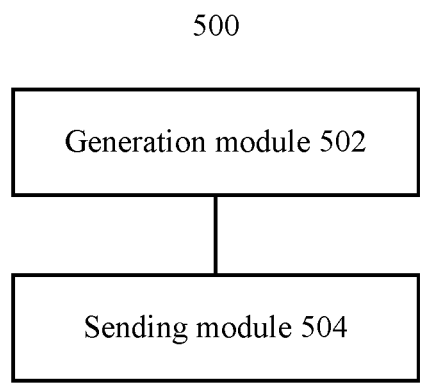
FIG. 5 is a schematic diagram of a logical structure of a receive end device according to an embodiment of the present invention.

FIG. 5 is a schematic diagram of a logical structure of a receive end device 500 according to an embodiment of the present invention. As shown in FIG. 5, the device 500 includes a generation module 502 and a sending module 504.

The generation module 502 is configured to generate at least one piece of description information for each of a plurality of subbands included in a wideband, where each piece of description information is used to describe a description vector of a channel matrix corresponding to the subband, the description information includes at least one of a vector parameter and a weighting parameter, the vector parameter is used to indicate at least two component vectors of the description vector, the weighting parameter is used to indicate a weight of each of the at least two component vectors, and the at least two component vectors are selected from a base codebook.

The sending module 504 is configured to send the at least one piece of description information.

The device 500 is configured to perform the method 300 shown in FIG. 3. Technical features related to the device 500 are described in detail above with reference to the accompanying drawings, for example, but not limited to, FIG. 3. Therefore, details are not described herein again.

Figure 6:
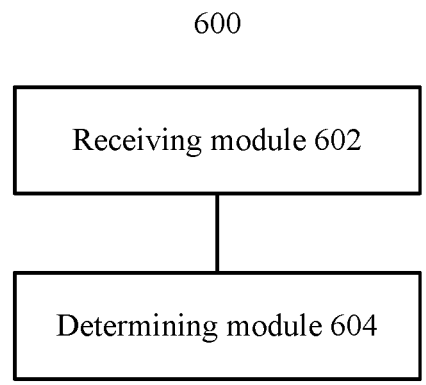
FIG. 6 is a schematic diagram of a logical structure of a transmit end device according to an embodiment of the present invention.

FIG. 6 is a schematic diagram of a logical structure of a transmit end device 600 according to an embodiment of the present invention. As shown in FIG. 6, the device 600 includes a receiving module 602 and a determining module 604.

The receiving module 602 is configured to receive at least one piece of description information generated for each of a plurality of subbands included in a wideband, where each piece of description information is used to describe a description vector of a channel matrix corresponding to the subband, the description information includes at least one of a vector parameter and a weighting parameter, the vector parameter is used to indicate at least two component vectors of the description vector, the weighting parameter is used to indicate a weight of each of the at least two component vectors, and the at least two component vectors are selected from a base codebook.

The determining module 604 is configured to determine, based on each piece of description information, the description vector corresponding to the description information.

The device 600 is configured to perform the method 400 shown in FIG. 4. Technical features related to the device 600 are described in detail above with reference to the accompanying drawings, for example, but not limited to, FIG. 4. Therefore, details are not described herein again.

Figure 7:
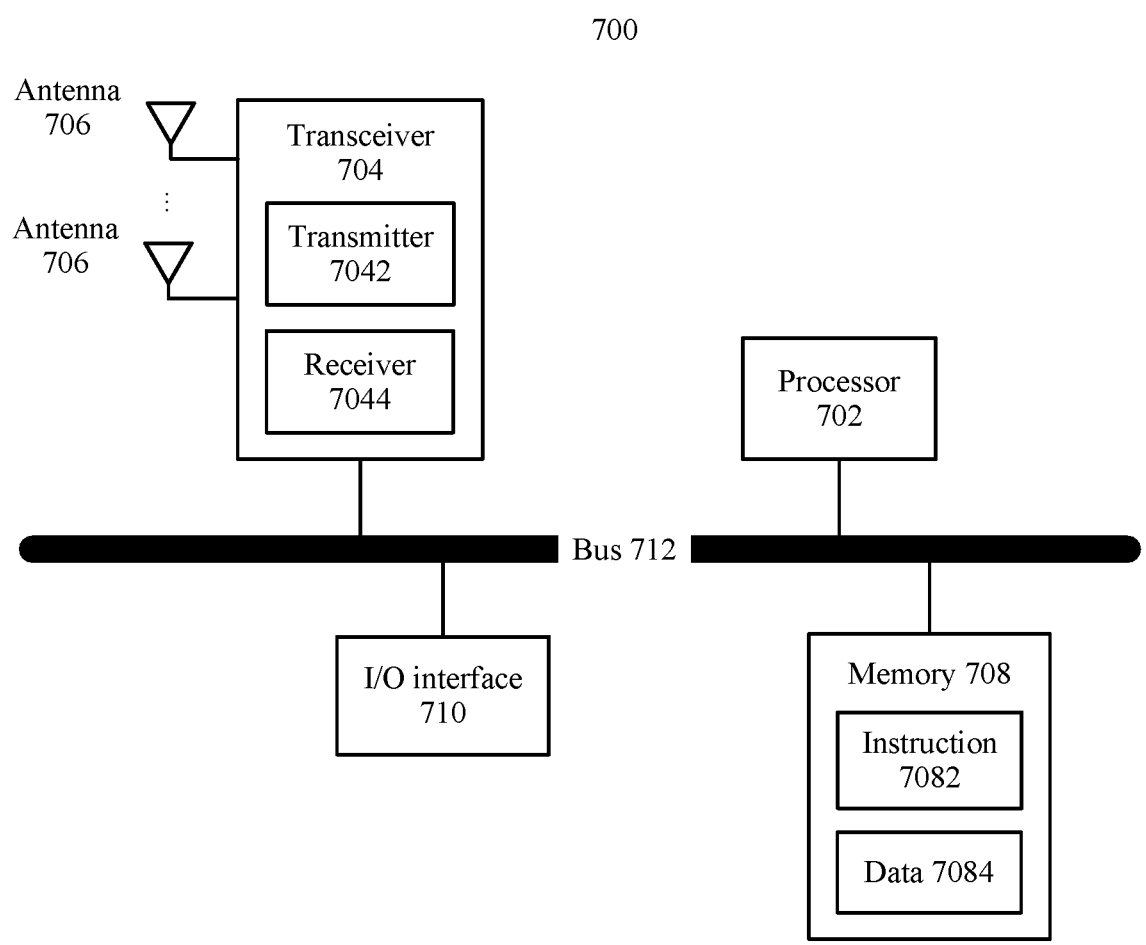
FIG. 7 is a schematic diagram of a hardware structure of a receive end device according to an embodiment of the present invention.

FIG. 7 is a schematic diagram of a hardware structure of a receive end device 700 according to an embodiment of the present invention. As shown in FIG. 7, the device 700 includes a processor 702, a transceiver 704, a plurality of antennas 707, a memory 708, an I/O (input/output, Input/Output) interface 710, and a bus 712. The transceiver 704 further includes a transmitter 7042 and a receiver 7044. The memory 708 is further configured to store an instruction 7082 and data 7084. In addition, the processor 702, the transceiver 704, the memory 708, and the I/O interface 710 are in communication connection with each other by using the bus 712. The plurality of antennas 706 are connected to the transceiver 704.

The processor 702 may be a general purpose processor, for example, but not limited to, a central processing unit (Central Processing Unit, CPU), or may be a dedicated processor, for example, but not limited to, a digital signal processor (Digital Signal Processor, DSP), an application-specific integrated circuit (Application-Specific Integrated Circuit, ASIC), and a field programmable gate array (Field Programmable Gate Array, FPGA). In addition, the processor 702 may alternatively be a combination of a plurality of processors. Particularly, in the technical solutions provided in this embodiment of the present invention, the processor 702 may be configured to perform, for example, step 302 in the channel information feedback method 300 shown in FIG. 3, and the operation performed by the generation module 502 in the receive end device 500 shown in FIG. 5. The processor 702 may be a processor specifically designed for performing the foregoing steps and/or operations, or may be a processor that performs the steps and/or operations by reading and executing the instruction 7072 stored in the memory 708. The processor 702 may need to use the data 7084 in a process of performing the foregoing steps and/or operations.

The transceiver 704 includes the transmitter 7042 and the receiver 7044. The transmitter 7042 is configured to send a signal by using at least one of the plurality of antennas 706. The receiver 7044 is configured to receive a signal by using at least one of the plurality of antennas 706. Particularly, in the technical solutions provided in this embodiment of the present invention, the transmitter 7042 may be specifically configured to perform, by using at least one of the plurality of antennas 706, for example, step 304 in the channel information feedback method 300 shown in FIG. 3, and the operation performed by the sending module 504 in the receive end device 500 shown in FIG. 5.

The memory 708 may be various types of storage media, for example, a random access memory (Random Access Memory, RAM), a read-only memory (Read-Only Memory, ROM), a non-volatile RAM (Non-volatile RAM, NVRAM), a programmable ROM (Programmable ROM, PROM), an erasable PROM (Erasable PROM, EPROM), an electrically erasable PROM (Electrically Erasable PROM, EEPROM), a flash memory, an optical memory, and a register. The memory 708 is specifically configured to store the instruction 7082 and the data 7084. The processor 702 may perform the foregoing steps and/or operations by reading and executing the instruction 7082 stored in the memory 708, and may need to use the data 7084 in a process of performing the foregoing steps and/or operations.

The I/O interface 710 is configured to receive an instruction and/or data from a peripheral device, and output an instruction and/or data to the peripheral device.

It should be noted that in a specific implementation process, the device 700 may further include other hardware components, which are not listed by way of example one by one in this specification.

Figure 8:
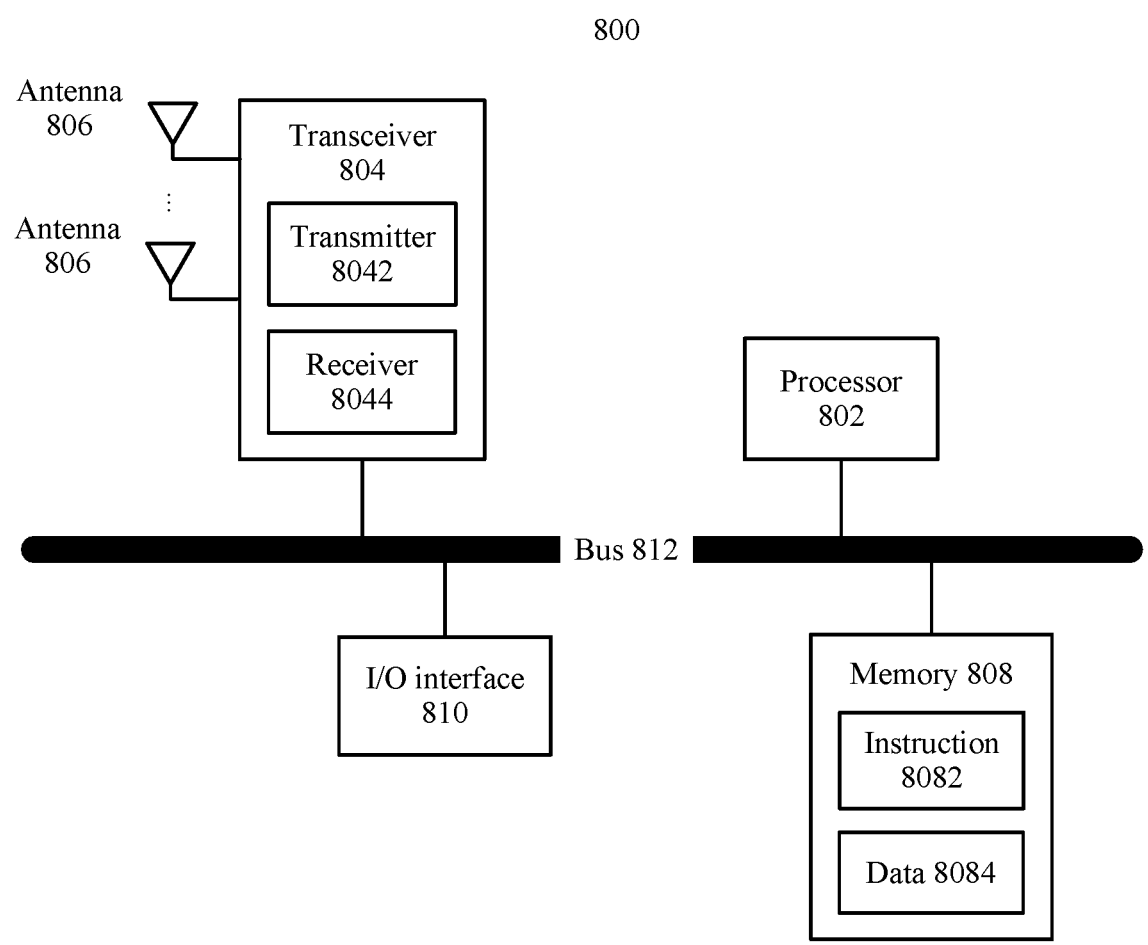
FIG. 8 is a schematic diagram of a hardware structure of a transmit end device according to an embodiment of the present invention.

FIG. 8 is a schematic diagram of a hardware structure of a receive end device 800 according to an embodiment of the present invention. As shown in FIG. 8, the device 800 includes a processor 802, a transceiver 804, a plurality of antennas 806, a memory 808, an I/O (input/output, Input/Output) interface 810, and a bus 812. The transceiver 804 further includes a transmitter 8042 and a receiver 8044. The memory 808 is further configured to store an instruction 8082 and data 8084. In addition, the processor 802, the transceiver 804, the memory 808, and the I/O interface 810 are in communication connection with each other by using the bus 812. The plurality of antennas 806 are connected to the transceiver 804.

The processor 802 may be a general purpose processor, for example, but not limited to, a central processing unit (Central Processing Unit, CPU), or may be a dedicated processor, for example, but not limited to, a digital signal processor (Digital Signal Processor, DSP), an application-specific integrated circuit (Application-Specific Integrated Circuit, ASIC), and a field programmable gate array (Field Programmable Gate Array, FPGA). In addition, the processor 802 may alternatively be a combination of a plurality of processors. Particularly, in the technical solutions provided in this embodiment of the present invention, the processor 802 is configured to perform, for example, step 404 in the channel information determining method 400 shown in FIG. 4, and the operation performed by the determining module 604 in the transmit end device 600 shown in FIG. 6. The processor 802 may be a processor specifically designed for performing foregoing the steps and/or operations, or may be a processor that performs the foregoing steps and/or operations by reading and executing the instruction 8082 stored in the memory 808. The processor 802 may need to use the data 8084 in a process of performing the foregoing steps and/or operations.

The transceiver 804 includes the transmitter 8042 and the receiver 8044. The transmitter 8042 is configured to send a signal by using at least one of the plurality of antennas 806. The receiver 8044 is configured to receive a signal by using at least one of the plurality of antennas 806. Particularly, in the technical solutions provided in this embodiment of the present invention, the receiver 8044 may be specifically configured to perform, by using at least one of the plurality of antennas 806, for example, step 402 in the channel information determining method 400 shown in FIG. 4, and the operation performed by the receiving module 602 in the transmit end device 600 shown in FIG. 6.

The memory 808 may be various types of storage media, for example, a random access memory (Random Access Memory, RAM), a read-only memory (Read-Only Memory, ROM), a non-volatile RAM (Non-volatile RAM, NVRAM), a programmable ROM (Programmable ROM, PROM), an erasable PROM (Erasable PROM, EPROM), an electrically erasable PROM (Electrically Erasable PROM, EEPROM), a flash memory, an optical memory, and a register. The memory 808 is specifically configured to store the instruction 8082 and the data 8084. The processor 802 may perform the foregoing steps and/or operations by reading and executing the instruction 8082 stored in the memory 808, and may need to use the data 8084 in a process of performing the foregoing steps and/or operations.

The I/O interface 810 is configured to receive an instruction and/or data from a peripheral device, and output an instruction and/or data to the peripheral device.

It should be noted that in a specific implementation process, the device 800 may further include other hardware components, which are not listed by way of example one by one in this specification.

Figure 9:
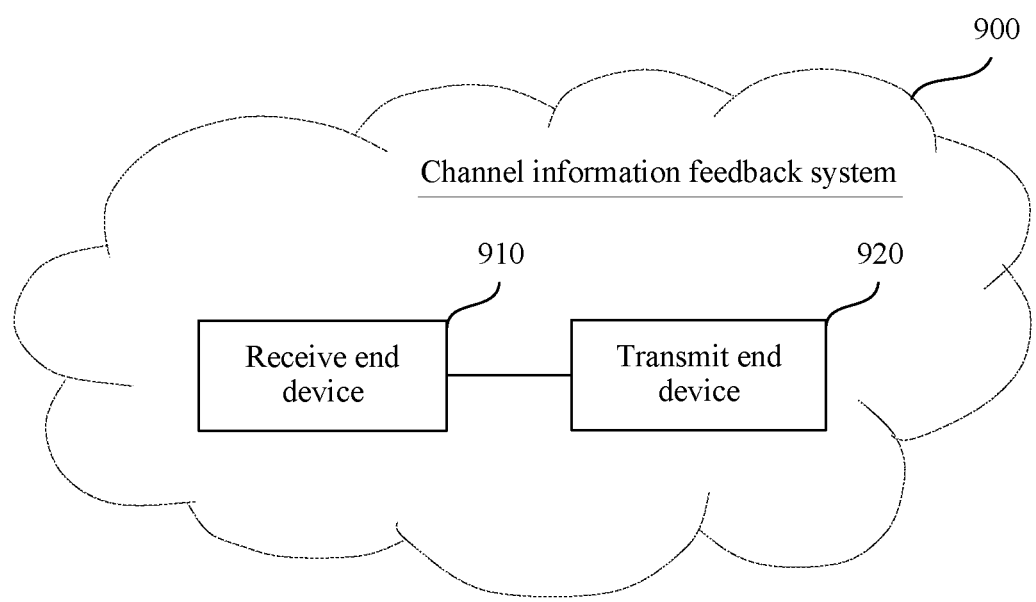
FIG. 9 is a schematic structural diagram of a channel information feedback system according to an embodiment of the present invention.

FIG. 9 is a schematic structural diagram of a channel information feedback system 900 according to an embodiment of the present invention. In a specific implementation process, as shown in FIG. 9, the channel feedback system 900 may include a receive end device 910 and a transmit end device 920.

In a possible implementation, the receive end device 910 is the receive end device 500 shown in FIG. 5, and the transmit end device 920 is the transmit end device 600 shown in FIG. 6.

In another possible implementation, the receive end device 910 is the receive end device 700 shown in FIG. 7, and the transmit end device 920 is the transmit end device 800 shown in FIG. 8.

The foregoing descriptions are merely some embodiments of the present invention, but are not intended to limit the scope of the present invention. Any modification, equivalent replacement, and improvement made without departing from the spirit and principle of the present invention shall fall within the protection scope of the embodiments of the present invention. For example, adding other processing steps before, during, and/or after the steps of the methods provided in the embodiments of the present invention, adding other processing modules to each apparatus provided in the embodiments of the present invention to complete additional processing, and applying the technical solutions provided in the embodiments of the present invention to a particular scenario or a particular condition all should be considered as further improvements made based on the technical solutions provided in the embodiments of the present invention, and therefore, fall within the scope of the present invention.

It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

A person of ordinary skill in the art may be aware that in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, the functional units in the embodiments of the present invention may be integrated into one processing unit, or each of the units may exist alone physically, or two or more units may be integrated into one unit.

When the functions are implemented in the form of a software functional unit and sold or used as an independent product, the functions may be stored in a computer readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A channel information feedback method, wherein the method comprises:

generating at least one piece of description information for each of a plurality of subbands comprised in a wideband, wherein each piece of description information is used to describe a description vector of a channel matrix corresponding to the subband, the description information comprises at least one of a vector parameter and a weighting parameter, the vector parameter is used to indicate at least two component vectors of the description vector, the weighting parameter is used to indicate a weight of each of the at least two component vectors, and the at least two component vectors are selected from a base codebook; and sending the at least one piece of description information.

2. The method according to claim 1, wherein the base codebook comprises a plurality of basic vectors, each component vector is one of the plurality of basic vectors, and the basic vector is:

$$c_{x,y} = v_x \otimes u_y, \text{ wherein}$$

$$v_x = \begin{bmatrix} 1 & e^{j\frac{2\pi x}{O_1 N_1}} & \ldots & e^{j\frac{2\pi x}{O_1 N_1}(N_1-1)} \end{bmatrix}$$

$$u_y = \begin{bmatrix} 1 & e^{j\frac{2\pi y}{O_2 N_2}} & \ldots & e^{j\frac{2\pi y}{O_2 N_2}(N_2-1)} \end{bmatrix}$$

wherein (x, y) represents a basic vector parameter, $O_1$, $N_1$, $O_2$ and $N_2$ are preset positive integers, $0 \leq x \leq O_1 N_1 - 1$, and $0 \leq y \leq O_2 N_2 - 1$.

3. The method according to claim 2, wherein the at least two component vectors comprise a starting vector and at least one offset vector, the vector parameter comprises a basic vector parameter (l, m) of the starting vector and an offset parameter (a, b) of each offset vector, a basic vector parameter of each offset vector is (l+aL,m+bM), $0 \leq l \leq O_1 N_1 - 1$, $0 \leq m \leq O_2 N_2 - 1$, L and M are preset positive integers, $L \leq O_1$, $M \leq O_2$, $$0 \leq a \leq \frac{O_1 N_1 - 1 - l}{L}, 0 \leq b \leq \frac{O_2 N_2 - 1 - m}{M},$$

and a and b are both integers and are not 0 at the same time.

4. The method according to claim 2, wherein the at least two component vectors comprise a starting vector and at least one offset vector, the vector parameter comprises a basic vector parameter (l, m) of the starting vector, an offset step (L, M), and an offset parameter (a, b) of each offset vector, a basic vector parameter of each offset vector is (l+aL, m+bM), the offset step (L, M) is one of a plurality of preset groups of offset steps, $1 \leq L \leq O_1$, $1 \leq M \leq O_2$, $0 \leq l \leq O_1 N_1 - 1$, $0 \leq m \leq O_2 N_2 - 1$, $$0 \leq a \leq \frac{O_1 N_1 - 1 - l}{L}, 0 \leq b \leq \frac{O_2 N_2 - 1 - m}{M},$$

and a and b are both integers and are not 0 at the same time.

5. The method according to claim 4, wherein the offset step (L, M) is an offset step corresponding to the basic vector parameter (l, m) of the starting vector in the plurality of preset groups of offset steps.

6. A channel information determining method, wherein the method comprises:
  receiving at least one piece of description information generated for each of a plurality of subbands comprised in a wideband, wherein each piece of description information is used to describe a description vector of a channel matrix corresponding to the subband, the description information comprises at least one of a vector parameter and a weighting parameter, the vector parameter is used to indicate at least two component vectors of the description vector, the weighting parameter is used to indicate a weight of each of the at least two component vectors, and the at least two component vectors are selected from a base codebook; and
  determining, based on each piece of description information, the description vector corresponding to the description information.

7. The method according to claim 6, wherein the base codebook comprises a plurality of basic vectors, each component vector is one of the plurality of basic vectors, and the basic vector is:

$$c_{x,y} = v_x \otimes u_y, \text{ wherein}$$

$$v_x = \begin{bmatrix} 1 & e^{j\frac{2\pi x}{O_1 N_1}} & \ldots & e^{j\frac{2\pi x}{O_1 N_1}(N_1-1)} \end{bmatrix}$$

$$u_y = \begin{bmatrix} 1 & e^{j\frac{2\pi y}{O_2 N_2}} & \ldots & e^{j\frac{2\pi y}{O_2 N_2}(N_2-1)} \end{bmatrix}$$

wherein (x, y) represents a basic vector parameter, $O_1$, $N_1$, $O_2$ and $N_2$ are preset positive integers, $0 \leq x \leq O_1 N_1 - 1$, and $0 \leq y \leq O_2 N_2 - 1$.

8. The method according to claim 7, wherein the at least two component vectors comprise a starting vector and at least one offset vector, the vector parameter comprises a basic vector parameter (l, m) of the starting vector and an offset parameter (a, b) of each offset vector, a basic vector parameter of each offset vector is (l+aL, m+bM), $0 \leq l \leq O_1 N_1 - 1$, $0 \leq m \leq O_2 N_2 - 1$, L and M are preset positive integers, $L \leq O_1$, $M \leq O_2$, $$0 \leq a \leq \frac{O_1 N_1 - 1 - l}{L}, 0 \leq b \leq \frac{O_2 N_2 - 1 - m}{M},$$

and a and b are both integers and are not 0 at the same time.

9. The method according to claim 7, wherein the at least two component vectors comprise a starting vector and at least one offset vector, the vector parameter comprises a basic vector parameter (l, m) of the starting vector, an offset step (L, M), and an offset parameter (a, b) of each offset vector, a basic vector parameter of each offset vector is (l+aL, m+bM), the offset step (L, M) is one of a plurality of preset groups of offset steps, $1 \leq L \leq O_1$, $1 \leq M \leq O_2$, $0 \leq l \leq O_1 N_1 - 1$, $0 \leq m \leq O_2 N_2 - 1$, $$0 \leq a \leq \frac{O_1 N_1 - 1 - l}{L}, 0 \leq b \leq \frac{O_2 N_2 - 1 - m}{M},$$

and a and b are both integers and are not 0 at the same time.

10. The method according to claim 9, wherein the offset step (L, M) is an offset step corresponding to the basic vector parameter (l, m) of the starting vector in the plurality of preset groups of offset steps.

11. A receive end device, comprising:
  a generation module, configured to generate at least one piece of description information for each of a plurality of subbands comprised in a wideband, wherein each piece of description information is used to describe a description vector of a channel matrix corresponding to the subband, the description information comprises at least one of a vector parameter and a weighting parameter, the vector parameter is used to indicate at least two component vectors of the description vector, the weighting parameter is used to indicate a weight of each of the at least two component vectors, and the at least two component vectors are selected from a base codebook; and
  a sending module, configured to send the at least one piece of description information.

12. The receive end device according to claim 11, wherein the base codebook comprises a plurality of basic vectors, each component vector is one of the plurality of basic vectors, and the basic vector is: $c_{x,y}=v_x \otimes u_y$, wherein $$v_x = \begin{bmatrix} 1 & e^{j\frac{2\pi x}{O_1 N_1}} & \ldots & e^{j\frac{2\pi x}{O_1 N_1}(N_1-1)} \end{bmatrix}$$

$$u_y = \begin{bmatrix} 1 & e^{j\frac{2\pi y}{O_2 N_2}} & \ldots & e^{j\frac{2\pi y}{O_2 N_2}(N_2-1)} \end{bmatrix}$$

wherein (x, y) represents a basic vector parameter, $O_1$, $N_1$, $O_2$ and $N_2$ are preset positive integers, $0 \leq x \leq O_1 N_1 - 1$, and $0 \leq y \leq O_2 N_2 - 1$.

13. The receive end device according to claim 12, wherein the at least two component vectors comprise a starting vector and at least one offset vector, the vector parameter comprises a basic vector parameter (l, m) of the starting vector and an offset parameter (a, b) of each offset vector, a basic vector parameter of each offset vector is (l+aL, m+bM), $0 \leq l \leq O_1 N_1 - 1$, $0 \leq m \leq O_2 N_2 - 1$, L and M are preset positive integers, $L \leq O_1$, $M \leq O_2$, $$0 \leq a \leq \frac{O_1 N_1 - 1 - l}{L}, 0 \leq b \leq \frac{O_2 N_2 - 1 - m}{M},$$

and a and b are both integers and are not 0 at the same time.

14. The receive end device according to claim 12, wherein the at least two component vectors comprise a starting vector and at least one offset vector, the vector parameter comprises a basic vector parameter (l, m) of the starting vector, an offset step (L, M), and an offset parameter (a, b) of each offset vector, a basic vector parameter of each offset vector is (l+aL, m+bM), the offset step (L, M) is one of a plurality of preset groups of offset steps, $1 \leq L \leq O_1$, $1 \leq M \leq O_1$, $0 \leq l \leq O_1 N_1 - 1$, $0 \leq m \leq O_2 N_2 - 1$, $$0 \leq a \leq \frac{O_1 N_1 - 1 - l}{L}, 0 \leq b \leq \frac{O_2 N_2 - 1 - m}{M},$$

and a and b are both integers and are not 0 at the same time.

15. The receive end device according to claim 14, wherein the offset step (L, M) is an offset step corresponding to the basic vector parameter (l, m) of the starting vector in the plurality of preset groups of offset steps.

16. A transmit end device, comprising:
a receiving module, configured to receive at least one piece of description information generated for each of a plurality of subbands comprised in a wideband, wherein each piece of description information is used to describe a description vector of a channel matrix corresponding to the subband, the description information comprises at least one of a vector parameter and a weighting parameter, the vector parameter is used to indicate at least two component vectors of the description vector, the weighting parameter is used to indicate a weight of each of the at least two component vectors, and the at least two component vectors are selected from a base codebook; and
a determining module, configured to determine, based on each piece of description information, the description vector corresponding to the description information.

17. The transmit end device according to claim 16, wherein the base codebook comprises a plurality of basic vectors, each component vector is one of the plurality of basic vectors, and the basic vector is $c_{x,y}=v_x \otimes u_y$, wherein $$v_x = \begin{bmatrix} 1 & e^{j\frac{2\pi x}{O_1 N_1}} & \ldots & e^{j\frac{2\pi x}{O_1 N_1}(N_1-1)} \end{bmatrix}$$

$$u_y = \begin{bmatrix} 1 & e^{j\frac{2\pi y}{O_2 N_2}} & \ldots & e^{j\frac{2\pi y}{O_2 N_2}(N_2-1)} \end{bmatrix}$$

wherein (x, y) represents a basic vector parameter, $O_1$, $N_1$, $O_2$ and $N_2$ are preset positive integers, $0 \leq x \leq O_1 N_1 - 1$, and $0 \leq y \leq O_2 N_2 - 1$.

18. The transmit end device according to claim 17, wherein the at least two component vectors comprise a starting vector and at least one offset vector, the vector parameter comprises a basic vector parameter (l, m) of the starting vector and an offset parameter (a, b) of each offset vector, a basic vector parameter of each offset vector is (l+aL, m+bM), $0 \leq l \leq O_1 N_1 - 1$, $0 \leq m \leq O_2 N_2 - 1$, L and M are preset positive integers, $L \leq O_1$, $M \leq O_2$, $$0 \leq a \leq \frac{O_1 N_1 - 1 - l}{L}, 0 \leq b \leq \frac{O_2 N_2 - 1 - m}{M},$$

and a and b are both integers and are not 0 at the same time.

19. The transmit end device according to claim 17, wherein the at least two component vectors comprise a starting vector and at least one offset vector, the vector parameter comprises a basic vector parameter (l, m) of the starting vector, an offset step (L, M), and an offset parameter (a, b) of each offset vector, a basic vector parameter of each offset vector is (l+aL, m+bM), the offset step (L, M) is one of a plurality of preset groups of offset steps, $1 \leq L \leq O_1$, $1 \leq M \leq O_2$, $0 \leq l \leq O_1 N_1 - 1$, $0 \leq m \leq O_2 N_2 - 1$, $$0 \leq a \leq \frac{O_1 N_1 - 1 - l}{L}, 0 \leq b \leq \frac{O_2 N_2 - 1 - m}{M},$$

and a and b are both integers and are not 0 at the same time.

20. The transmit end device according to claim 19, wherein the offset step (L, M) is an offset step corresponding to the basic vector parameter (l, m) of the starting vector in the plurality of preset groups of offset steps.

* * * * *